US011287987B2

(12) United States Patent
Li et al.

(10) Patent No.: US 11,287,987 B2
(45) Date of Patent: Mar. 29, 2022

(54) COHERENCY LOCKING SCHEMES

(71) Applicant: Micron Technology, Inc., Boise, ID (US)

(72) Inventors: Yun Li, Fremont, CA (US); John Traver, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 11 days.

(21) Appl. No.: 16/809,058

(22) Filed: Mar. 4, 2020

(65) Prior Publication Data

US 2021/0278976 A1 Sep. 9, 2021

(51) Int. Cl.
*G06F 12/00* (2006.01)
*G06F 3/06* (2006.01)
*G06F 13/00* (2006.01)
*G06F 13/28* (2006.01)

(52) U.S. Cl.
CPC .......... *G06F 3/0619* (2013.01); *G06F 3/0659* (2013.01); *G06F 3/0679* (2013.01)

(58) Field of Classification Search
CPC ..... G06F 3/0619; G06F 3/0679; G06F 3/0659
See application file for complete search history.

(56) References Cited

U.S. PATENT DOCUMENTS

| 2007/0226447 | A1* | 9/2007 | Shimozono | G06F 3/0665 711/170 |
| 2009/0013119 | A1* | 1/2009 | Clark | G06F 3/0659 710/265 |
| 2016/0092352 | A1* | 3/2016 | Camp | G06F 3/064 711/103 |
| 2018/0267893 | A1* | 9/2018 | Barzik | G06F 12/0246 |
| 2020/0105331 | A1* | 4/2020 | Pauley | G11C 11/409 |

* cited by examiner

*Primary Examiner* — Mark A Giardino, Jr.
(74) *Attorney, Agent, or Firm* — Holland & Hart LLP

(57) ABSTRACT

Methods, systems, and devices for coherency locking are described in which different types of writes have different coherency locking schemes. The types of writes can be associated with different sources of write commands, such as external commands from a host system or internal commands from a garbage collection procedure. Coherency locking can be performed for external write commands received from a host system, while coherency locking is not performed for internal write commands. If an internal write is received for data that has been previously written at a prior location, a write to one or more physical memory devices can be performed and, once an acknowledgment is received that the write is complete, an update to a mapping table with the new location of the data is performed.

20 Claims, 5 Drawing Sheets

COHERENCY LOCKING SCHEMES

TECHNICAL FIELD

The following relates generally to a memory sub-system and more specifically to coherency locking schemes for a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
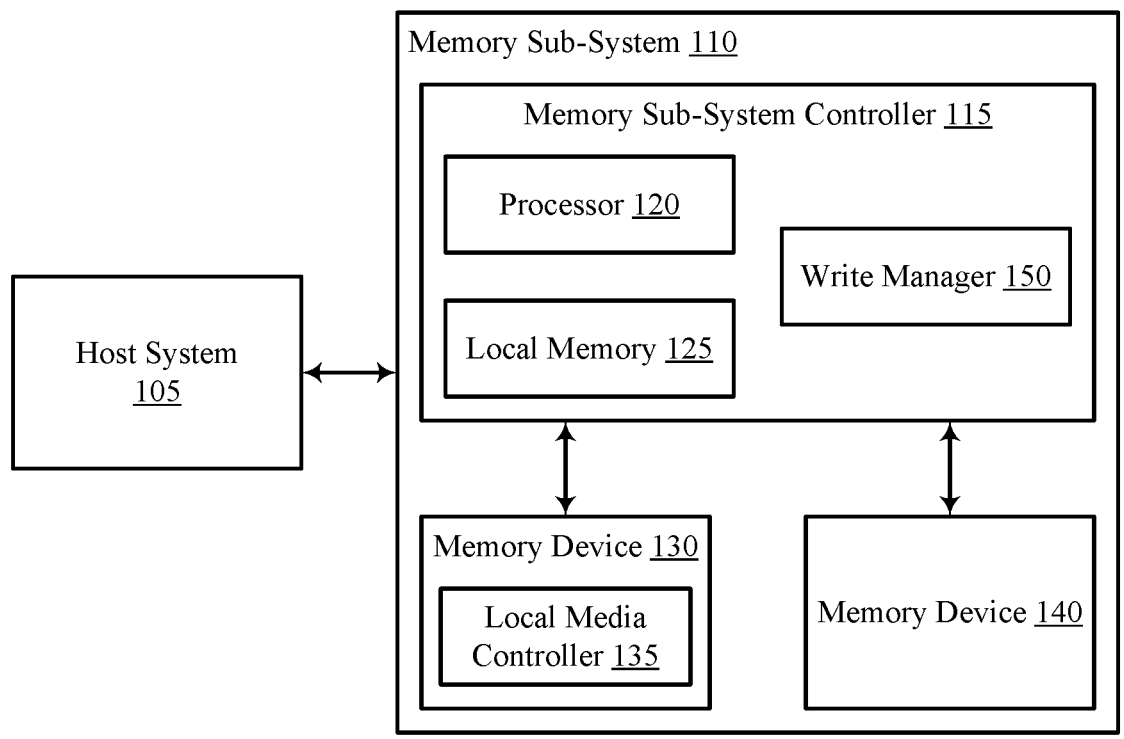
FIG. 1 illustrates an example of a computing system that includes a memory sub-system in accordance with some examples of the present disclosure.

Aspects of the present disclosure are directed to coherency locking schemes. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. A non-volatile memory device is a package of one or more dice. Each die can consist of one or more planes. For some types of non-volatile memory devices (e.g., negative-and (NAND) devices), each plane consists of a set of physical blocks. Each block consists of a set of pages. Each page consists of a set of memory cells, which store bits of data. For some memory devices, such as NAND devices, blocks are the smallest area than can be erased and pages within the blocks cannot be erased individually. For such devices, erase operations are performed one block at a time.

A page of a block can contain valid data, invalid data, or no data. Invalid data is data that is marked as outdated as a new version of the data is stored on the memory device. Invalid data includes data that was previously written but is no longer associated with a valid logical address, such as a logical address referenced by a host system in a physical to logical (P2L) mapping table. Valid data is the most recent version of such data being stored on the memory device. A memory sub-system can mark data as invalid based on information received, for example, from an operating system. A page that does not contain data includes a page that has been previously erased, and not yet written to.

A memory sub-system controller can perform operations for media management algorithms, such as wear leveling, refresh, garbage collection, scrub, etc. A block may have some pages containing valid data and some pages containing invalid data. To avoid waiting for all of the pages in the block to have invalid data in order to erase and reuse the block, an algorithm hereinafter referred to as "garbage collection" can be invoked to allow the block to be erased and released as a free block for subsequent write operations. Garbage collection is a set of media management operations that include, for example, selecting a block that contains valid and invalid data, selecting pages in the block that contain valid data, copying the valid data to new locations (e.g., free pages in another block), marking the data in the previously selected pages as invalid, and erasing the selected block.

"Garbage collection" hereinafter refers to selecting a block, rewriting the valid data from the selected block to another block, and erasing all invalid data and valid data stored at the selected block. The valid data from multiple selected blocks can be copied to a smaller number of other blocks and the selected blocks can then be erased. As a result, the number of blocks that have been erased can be increased such that more blocks are available to store subsequent data from a host system.

During garbage collection, valid data of the block to be erased is initially read into and stored by a buffer based on one or more read commands issued by a memory sub-system controller and the corresponding page (e.g., the page on which the valid data is contained) is erased. The valid data can then be written (e.g., re-written) to the memory device (e.g., to a different page of the memory device). In order to write the valid data to a location (e.g., a different page of the memory device), write commands are issued by the memory sub-system controller, each write command indicating a memory address (e.g., a destination memory address) to which the valid data is to be written. In some garbage collection procedures, the write commands are issued once the corresponding read command has been completed.

Further, in traditional access operations of memory sub-systems, commands associated with different access operations (e.g., read operations, write operations, etc.) can be constantly transmitted by the host system and received by the memory sub-system. For example, the host system can transmit a write command for one or more TUs of data to be written. Further, a read command can be transmitted requesting data from one or more TUs. Conventionally, upon receiving a write command, firmware at a memory sub-system can update a mapping table (e.g., a physical-to-logical (P2L) mapping table) to associate a physical memory location with a TU, and then write the data to a memory device (e.g. NAND memory). Because the mapping table is updated prior to data actually being physically written to NAND memory, traditionally such firmware will perform coherency procedures to prevent data from being read from a NAND memory location prior to the data actually being written to the NAND memory location. Additionally, in traditional systems, firmware will perform such coherency procedures for write operations based on a write command from a host system and for write operations of media management (e.g., garbage collection).

For example, if a first write command (e.g., from a host system or initiated for media management) spans a first set of TUs, and a read command is received for a second set of TUs that overlap the first set of TUs, the coherency operations prevent the overlapping TUs from being read from the NAND memory before they are actually written pursuant to the write command. In such traditional systems, for each write operation from the host system or imitated for media management, the firmware performs operations to update the mapping table for a TU, lock coherency for the TU, perform the write to the physical memory device(s), release the coherency lock, and update any associated buffers in which the data was stored during the write. Further, for each read operation, the firmware performs operations to check the coherency for the associated TUs to be read, then either read the data if coherency is not locked or perform another operation if the coherency is locked (e.g., wait for the coherency to unlock or read the data from a buffer). Such coherency operations performed by the firmware thus consume a number of processing cycles of a processor used to perform the coherency operations. Accordingly, traditional coherency operations can result in system resources being used for coherency locking, unlocking, and checking, for write operations from a host system or a garbage collection procedure, which can increase latency for operations to be performed at the memory sub-system. Thus a system to effectively manage coherency at a hardware level can be beneficial.

Aspects of the present disclosure address the above and other deficiencies by providing a memory sub-system in which coherency operations are performed for write commands received from a host system and not performed for write commands generated internally within the memory sub-system, such as writes initiated for media management. Such coherency locking schemes as provided herein can substantially reduce the processing overhead associated with implementation of coherency checking. In some examples, if a write is received from a host system, the memory sub-system can perform coherency operations as discussed above by locking coherency of one or more TUs associated with the host system write, updating the mapping table, performing the write to the physical memory device(s), and unlocking the coherency lock for the one or more TUs. However, if a write is received from an internal processor of the memory sub-system that is running a media management operation (e.g., garbage collection), the coherency operations can be skipped, thus saving processing overhead of the coherency operations.

In cases where coherency operations are skipped, the memory sub-system can first perform the write to the physical memory device(s) and, once an acknowledgment is received that the write is complete, then update the mapping table with the new location of the data. Thus, the mapping table contains a prior location of the data until it is updated after the write is complete. By updating the mapping table after the write is complete, any read command for this data that is received during the write operation will identify the prior location of the data and return the data from the prior location. Because the prior location of the data still contains the data, the proper data is returned for the read command. Thus, read performance of the system can be improved due to reduced instances where coherency of a TU is locked, which can improve the memory sub-system's ability to aggregate read operations (e.g., into multi-plane reads) or perform snap reads or other fast read operations. In some examples, aggregating multiple read operations can result in the memory sub-system experiencing reduced power consumption. After the write is complete and the mapping table is updated, any future read commands will read the newly written data, and the prior location can be erased or re-written with different data.

Further, in some examples, a hardware coherency block can be used to maintain coherency locks and release coherency upon completion of write commands, which can further enhance efficiency of a memory sub-system that contains multiple processing cores. For example, a first processing core can perform a write operation from a host for a first TU, and can lock coherency associated with the first TU at the hardware coherency block. A second processing core can then perform a read operation for the first TU, and check coherency at the coherency block to determine that coherency is locked for the first TU. Thus, by having the hardware coherency block, the different processing cores can perform coherency operations for independent read or write operations by accessing the common hardware coherency block without having to exchange messages between the processing cores as would be needed in cases where each processing core separately performs each of the steps of coherency operations. Thus, multiple processing cores can perform independent memory operations, including host read and write operations, and garbage collection read and write operations, using the hardware coherency block, which can further enhance efficiency and reduce latency associated with the memory sub-system.

Features of the disclosure are initially described in the context of a computing environment as described with reference to FIG. 1. Features of the disclosure are described in the context of method diagrams and a computing environment that can implement coherency locking schemes as described with reference to FIGS. 2 through 4. These and other features of the disclosure are further illustrated by and described with reference to a computer system that relates to coherency locking schemes as described with reference to FIG. 5.

FIG. 1 illustrates an example computing system 100 that includes a memory sub-system 110 in accordance with some embodiments of the present disclosure. The memory sub-system 110 can include media, such as one or more non-volatile memory devices (e.g., memory device(s) 130), one or more volatile memory devices (e.g., memory device(s) 140), or a combination thereof.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile DIMM (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 105 that is coupled with one or more memory sub-systems 110.

In some examples, the host system 105 is coupled with different types of memory sub-systems 110. FIG. 1 illustrates one example of a host system 105 coupled with one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 105 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 105 uses the memory sub-system 110, for example, to write data to the memory sub-system 110 and read data from the memory sub-system 110.

The host system 105 can be coupled to the memory sub-system 110 using a physical host interface. Examples of a physical host interface include, but are not limited to, a serial advanced technology attachment (SATA) interface, a peripheral component interconnect express (PCIe) interface, universal serial bus (USB) interface, Fiber Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 105 and the memory sub-system 110. The host system 105 can further utilize a non-volatile memory Express (NVMe) interface to access components (e.g., memory device(s) 130) when the memory sub-system 110 is coupled with the host system 105 by the PCIe interface. The physical host interface can provide an interface for passing control, address, data, and other signals between the memory sub-system 110 and the host system 105. FIG. 1 illustrates a memory sub-system 110 as an example. In general, the host system 105 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device(s) 140) can be, but are not limited to, random access memory (RAM), such as dynamic RAM (DRAM) and synchronous DRAM (SDRAM).

Some examples of non-volatile memory devices (e.g., memory device(s) 130) includes a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric RAM (FeRAM), magneto RAM (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable ROM (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), a digital signal processor (DSP)), or other suitable processor.

The memory sub-system controller 115 can include a processor 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory sub-system 110, including handling communications between the memory sub-system 110 and the host system 105.

In some examples, the local memory 125 can include memory registers storing memory pointers, fetched data, etc. The local memory 125 can also include read-only memory (ROM) for storing micro-code. While the example memory sub-system 110 in FIG. 1 has been illustrated as including the memory sub-system controller 115, in another example of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 105 via the physical host interface. The host interface circuitry can convert the commands received from the host system into command instructions to access the memory devices 130 and/or the memory device 140 as well as convert responses associated with the memory devices 130 and/or the memory device 140 into information for the host system 105.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a write manager 150 that can perform write operations, including write operations that originate externally from the memory sub-system 110 e.g., from the host system 105) and write operations that originate internally from the memory sub-system 110 (e.g., from a garbage collection procedure). The garbage collection procedure can be a process by which data is migrated from one location (e.g., a source memory address) to another location (e.g., a target or destination memory address) independent of any direct host interaction.

In some examples, the memory sub-system controller 115 includes at least a portion of the write manager 150. For example, the memory sub-system controller 115 can include a processor 120 (e.g., a processing device with two or more processing cores) configured to execute instructions (e.g., firmware) stored in local memory 125 for performing the operations described herein. In some examples, the write manager 150 is part of the host system 105, an application, or an operating system.

The write manager 150 in accordance with various aspects described herein can perform coherency operations (e.g., lock coherency) for write operations that originate externally from the memory sub-system 110, while not performing coherency operations for write operations that originate internally from the memory sub-system 110. Additionally, in some examples the write manager 150 can use two or more different processing cores for performing write operations, with a hardware coherency block is accessible by each processing core and that allows different processing cores to perform read and write operations independently of one another. Further details with regards to the operations of the write manager 150 are described below.

Figure 2:
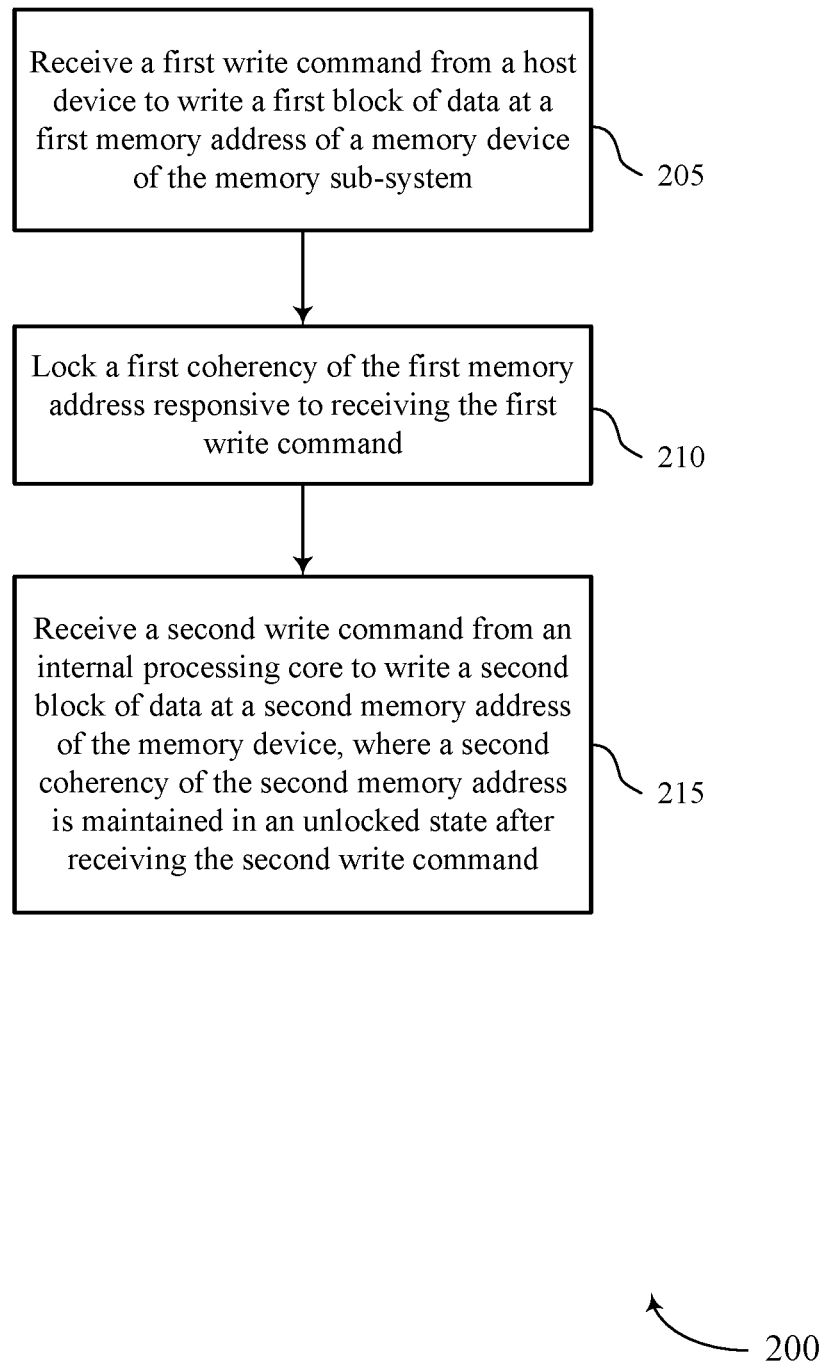
FIG. 2 is a method diagram of an example method for coherency locking schemes in accordance with some examples of the present disclosure.

FIG. 2 is a method diagram of an example method 200 of coherency locking in accordance with some examples of the present disclosure. The method 200 can be performed by processing logic that can include hardware (e.g., processing device, one or more processing cores, circuitry, dedicated logic, programmable logic, microcode, hardware of a device, integrated circuit, etc.), software (e.g., instructions run or executed on a processing device), or a combination thereof. In some examples, the method 200 is performed by the write manager 150 of FIG. 1. Although shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

At operation 205, the processing device can receive a first write command from an external device, such as a host device, to write a first block of data at a first memory address of a memory device of a memory sub-system. In some examples, the processing device can update, responsive to receiving the first write command, the mapping record to indicate the first block of data is located at the first memory address. In some examples, the mapping record can be a P2L mapping table that maps a physical memory location to the first memory address.

At operation 210, the processing device can lock a first coherency of the first memory address responsive to receiving the first write command. In some examples, the processing device can provide a coherency lock command and the first memory address to a coherency block of the memory sub-system. In some examples, the coherency block can be a hardware-based coherency block that is coupled with two or more different processing cores and performs coherency operations for the two or more different processing cores.

In some examples, after data is written to the memory device for the first memory address, the processing device can unlock or release the lock on the first coherency of the first memory address. In some examples, the processing device can receive a read command to read the first block of data after receiving the first write command and before releasing the coherency for the first block of data. In such cases, the processing device can provide a coherency lock indication responsive to the read command. In some examples, the processing device can check whether the coherency for the first block of data is locked by requesting a coherency status from the hardware-based coherency block. In some examples, a processing core that executes the read command can be different than a processing core that executes the first write command, and each processing core can use the hardware-based coherency block for coherency operations.

At operation 215, the processing device can receive, from sub-component of the memory sub-system (e.g., a processing core running a garbage collection procedure), a second write command to write a second block of data at a second memory address of the memory device, where a second coherency of the second memory address is maintained in an unlocked state after receiving the second write command. In some examples, the processing device can wait until the second write command is complete before updating the mapping record to indicate the second block of data is located at the second memory address. Thus, the mapping record indicates that the second block of data is located at a prior memory address prior to the updating and during the second write command operations.

In some examples, the second block of data is moved from the prior memory address to the second memory address as part of a garbage collection procedure. In some examples, the processing device can receive, prior to the updating the mapping record for the second block of data, a read command to read the second block of data. In such examples, the processing device can read the prior memory address to provide the second block of data responsive to the read command. In some examples, the first write command and the second write command are received at a first processing core, and the second write command is received from a second processing core of the memory sub-system.

Figure 3:
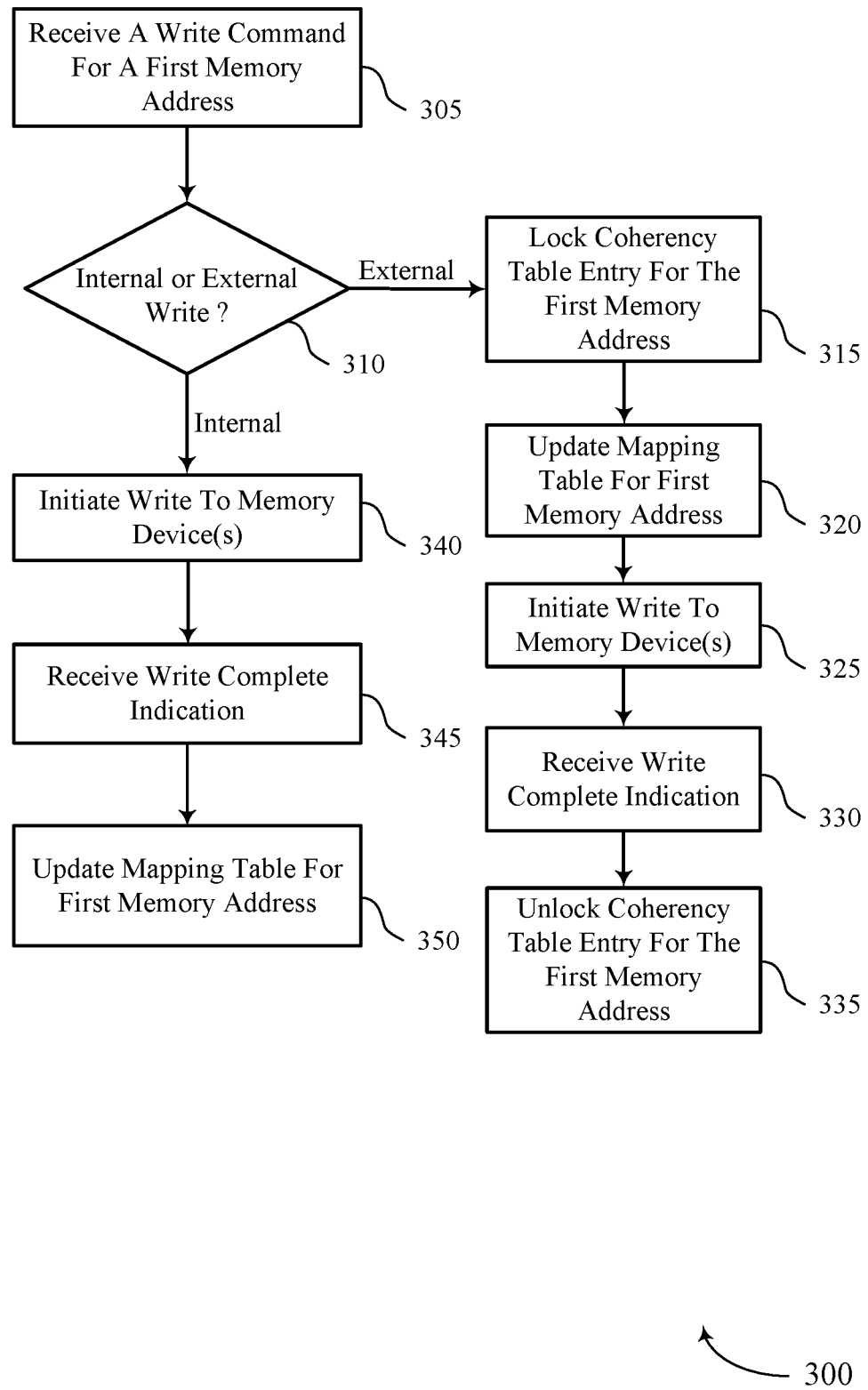
FIG. 3 is another method diagram of an example method for coherency locking schemes in accordance with some examples of the present disclosure.

FIG. 3 illustrates another method diagram of an example method 300 of coherency locking in accordance with some examples of the present disclosure. The method 300 can be performed by processing logic that can include hardware (e.g., processing device, one or more processing cores, circuitry, dedicated logic, programmable logic, microcode, hardware of a device, integrated circuit, etc.), software (e.g., instructions run or executed on a processing device), or a combination thereof. In some examples, the method 300 is performed by the write manager 150 of FIG. 1. Although shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

At operation 305, the processing device can receive a write command for a first memory address. In some examples, the write command can be for a first block of data that is to be written at the first memory address. In some examples, the processing device can be a processing core that performs flash translation layer (FTL) functions for write operations from internal processes (e.g., a garbage collection performed at the memory sub-system) and for write operations from external devices (e.g., a host system).

At operation 310, the processing device can determine whether the write command is an internal write command or an external write command. In some examples, such a determination can be made based on whether the write command is from the host system or from a garbage collection manager within the memory sub-system.

At operation 315, in examples where the write command is from an external device, the processing device can lock a first entry in a coherency table that is associate with the first memory address. In some examples, the first entry in the coherency table can be locked by providing a coherency lock indication to a coherency block that is coupled with the processing device (e.g., a hardware-based coherency block). In some examples, the first entry in the coherency table can indicate a block that contains the first memory address, such as an address (e.g., a systag) of a TU that contains the first memory address, and a coherency record can be maintained in a logical address record storage block (e.g., a systag table) of the hardware-based coherency block.

At operation 320, the processing device can update a mapping table for the first memory address. For example, the first memory address can be mapped to a first physical address (e.g., by a systag allocation block) and a L2P mapping table can be updated to indicate the first memory address corresponds to the first physical address of one or more memory devices. In some examples, the mapping table can be updated relatively quickly, while the process of writing data to the first physical address may take a relatively longer period of time. Thus, the coherency lock for the first memory address can be used to prevent a read command from reading data from the first physical address based on the updated mapping table before the write is complete at the physical memory device(s). For example, a processing core at the memory sub-system, which can be different than a processing core executing the write commend, can receive a read command for the first memory address before the write process at the physical memory device(s) is complete. As part of the read procedure, the coherency of the first memory address can be checked, and if the coherency is locked other actions can be taken, such as reading data from a buffer or executing a wait procedure, rather than reading the data from the physical memory device(s). In cases where coherency is not locked for an address of a read command, data can simply be read from the mapped location at the physical memory device(s).

At operation 325, the processing device can initiate the write to the memory device(s). As indicated, in some examples the write to the memory device(s) can include writing received data at the first physical address that is mapped to the first memory address.

At operation 330, the processing device can receive a write complete indication. In some examples, the write complete indication can be provided from a local media controller operating at the physical memory device(s).

At operation 335, the processing device can, responsive to the write complete indication, unlock the first coherency entry in the coherency table that is associated with the first memory address. In some examples, the first coherency entry can be unlocked by the hardware-based coherency block that can provide a status update in a statue queue. In some examples, the first coherency entry can be unlocked upon confirming that no other write commands associated with the block that contains the first memory address have outstanding write operations that originated from an external device.

At operation 340, in the event that the write command is an internal write command, the processing device can initiate the write to the physical memory device(s). For example, the internal write command can be generated by a garbage collection procedure that moves data from a prior physical memory address to a new physical memory address, and the first memory address is mapped to the prior physical memory address (e.g., in the L2P mapping table) prior to the operations of method 300. Thus, in this example, the processing device does not lock coherency for the first memory address. In such cases, if a read command for the first memory address is received prior to the write being completed at the physical memory device(s), the mapping table still indicates the prior memory address, and the read command can be performed to read the data from the prior memory address.

At operation 345, the processing device can receive a write complete indication. The write complete indication can signal that the write command has been completed at the physical memory device(s), and the new physical memory address thus contains the data from the write command.

At operation 350, the processing device can update the mapping table for the first memory address. In some examples, the mapping table can be updated to change the prior physical memory address to the new physical memory address. Thus, any subsequent read commands that indicate the first memory address are mapped to the new physical memory address.

Thus, coherency locking schemes such as in this example can provide that coherency is locked for writes of data that originate from external devices, but not for writes of data that originate internally at the memory sub-system. Because the data associated with the writes originated internally is already existing at the memory sub-system, return of the proper data is provided through the mapping table that continues to provide the prior physical memory address until the new physical memory address actually has the data written thereto. Further, for writes that originate externally from the memory sub-system, the data will not have been previously stored, and thus the mapping table needs to be updated in order to determine the physical memory location for the data, and coherency of the first memory address is locked to prevent a read from returning incorrect data (e.g., returning an empty page) prior to completion of the write at the physical memory device(s). As discussed herein, traditional techniques for coherency locking would lock coherency for a write command irrespective of whether the write originated internally or externally of the memory sub-system. Techniques such as discussed herein thus skip coherency operations for internal writes, and thus reduce the amount of processing overhead associated with such internal writes and thereby enhance system efficiency and reduce latency.

Figure 4:
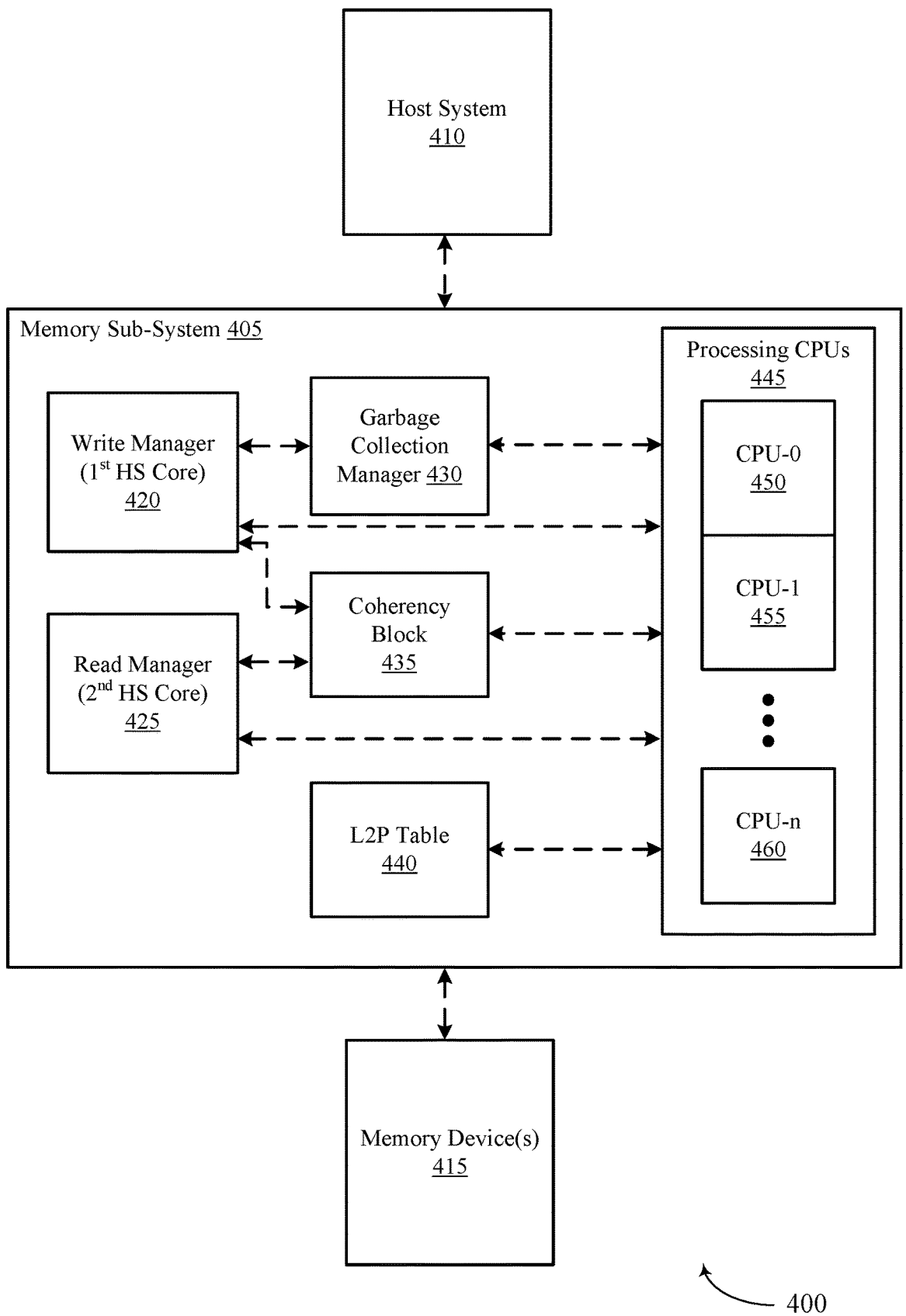
FIG. 4 is a block diagram of a computing environment that can implement coherency locking schemes in accordance with some examples of the present disclosure.

FIG. 4 illustrates an example of a memory system 400 that can implement coherency locking techniques in accordance with some examples of the present disclosure. The memory system 400 can include a memory sub-system 405, a host system 410, and one or more memory devices 415. The memory sub-system 405 can receive memory commands from host system 410, in some examples, and such memory commands can be referred to as external memory commands (e.g., a write command from an external device). In some examples, the memory sub-system 405 can be an example of a memory sub-system 110 of FIG. 1, and can execute operations such as described with reference to FIG. 2 or 3.

In the example of FIG. 4, the memory sub-system 405 can include a write manager 420 and a read manager 425. For example, write manager 420 can be an input/output (I/O) manager that performs write command processing, and performs data transfer and response operations with the host system 410 for write commands. In some examples, the write manager 420 can be executed on a processor or processing core within the memory sub-system 405. Likewise, the read manager 425 can be an I/O manager that performs read command processing, and performs data transfer and response operations with the host system 410 for read commands. In some examples, the read manager 425 can be executed on a different processor or processing core (e.g., a HS core, with four HS cores present in the memory sub-system 405) than the write manager 420.

In the example of FIG. 4, a garbage collection manager 430 can be coupled with the write manager 420. In some examples, the garbage collection manager 430 can be implemented with a FTL manager at the memory sub-system 405 (e.g., on a HS core). The garbage collection manager 430, in some examples, can perform a garbage collection algorithm that manages data that is stored at the memory device(s). For example, the garbage collection manager 430 can move (e.g., re-write) pages of valid data, that are intermixed at the memory device(s) 415 with pages of dirty or stale data, to other locations of the memory device(s) 415 that are contiguous with other pages of valid data. In some examples, the garbage collection manager 430 can coordinate with write manager 420 to perform writes of data that result from the garbage collection algorithm.

The write manager 420, in the example of FIG. 4, is coupled with coherency block 435. In some examples, coherency block 435 can be a hardware-based block that provides coherency operations for the write manager 420. In some examples, the hardware-based coherency block 435 can be coupled with the write manager 420 by a direct bridge (e.g., a level-zero cache). Further, a number of processing CPUs 445 (e.g., EM CPUs) can be used to execute memory commands of the memory, which can include CPU-0 450, CPU-1 455, through CPU-n 460. As described with reference to FIGS. 2 and 3, in some examples the write manager 420 can perform coherency operations for write commands that originate externally of the memory sub-system 405, such as for write operations from host system 410, but not perform coherency operations for write commands that originate from within the memory sub-system 405, such as for write operations of the garbage collection manager 430. In cases where coherency is locked, a mapping between a logical access and physical address can be updated in L2P table 440 upon receiving the write command, and in cases where coherency is not locked, the mapping at the L2P table 440 is not updated until after completion of the write command. In some examples, if a power loss occurs during a garbage collection write, since the L2P table 440 is not updated, information related to the garbage collection write can be lost. In such events, the garbage collection algorithm can be re-run to re-initiate the garbage collection write in the normal course of garbage collection procedures.

In some examples, the read manager 425, and the write manager 420 and the garbage collection manager 430 can use different cores. Further, in some examples, each of the cores can independently execute memory commands and may provide information to coherency block 435, such that if a first core (e.g., a first HS core of the write manager 420) locks coherency for a first memory address, then a second core (e.g., a second HS core of the read manager 425) can check coherency for the first memory address based on a status provided by the coherency block 435. As discussed herein, the garbage collection manager 430 does not perform coherency operations for garbage collection writes and only updates the L2P table 440 when a write is complete, and thus coherency locking or status for garbage collection writes are unnecessary. Further, in cases where the coherency block 435 is coupled with such cores by a direct bridge (e.g., a level-zero cache), each core can simply check a status queue in the direct bridge to determine if the first memory address has coherency locked or not. Additionally or alternatively, each of the processing CPUs 445 can access the coherency block 435 to perform coherency-related operations. Thus, in such cases, multiple of the processing cores and/or CPUs 445 can concurrently and independently perform write and read operations without having to exchange information related to coherency of memory addresses, which would be needed if one core maintained all of the coherency operations for a particular write command. Thus, the write manager 420, the read manager 425, and the garbage collection manager 430 can use different cores and different processing CPUs 445, which may provide enhanced performance and reduced latency at the memory sub-system 405.

Figure 5:
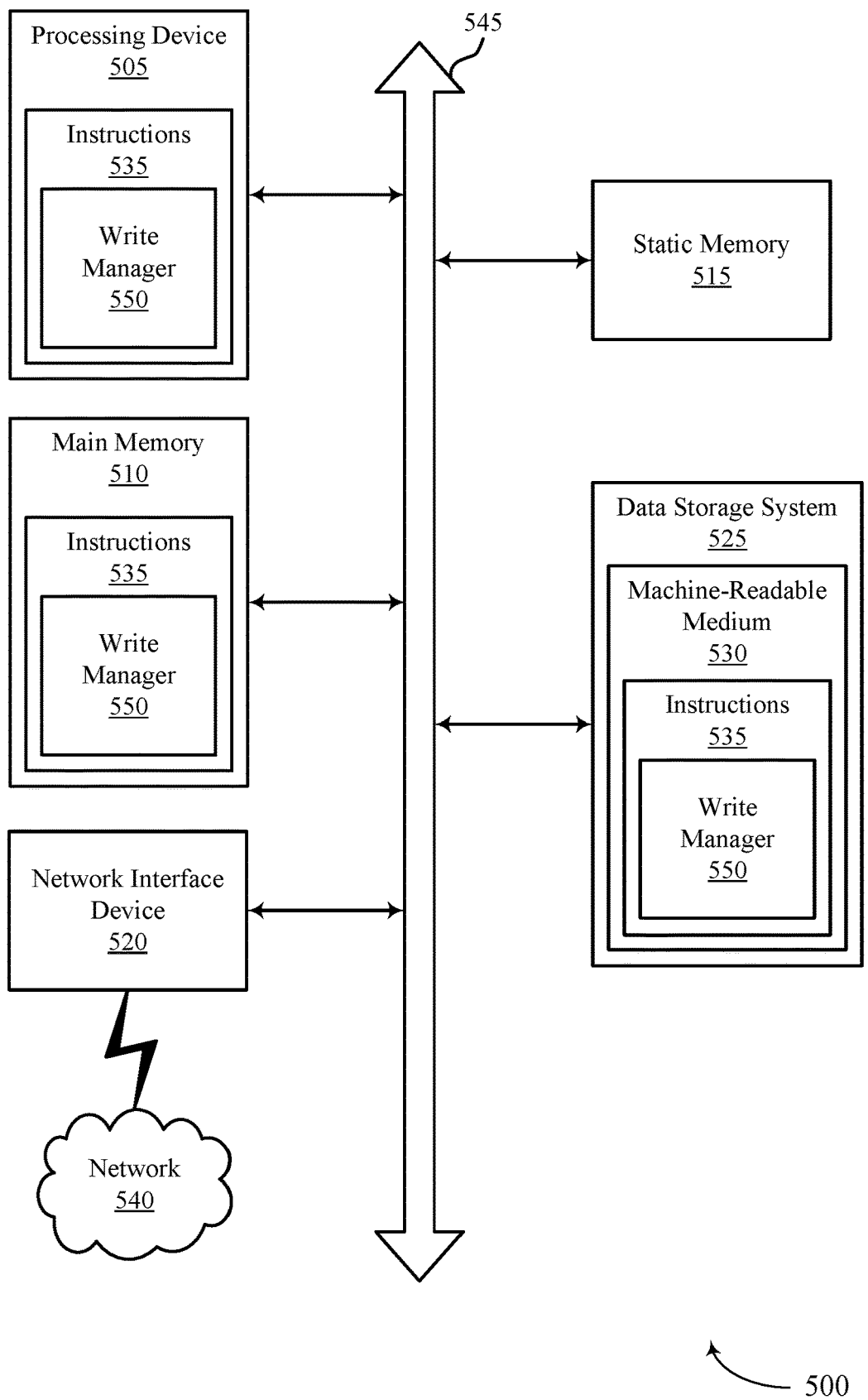
FIG. 5 is a block diagram of an example computer system in which examples of the present disclosure can operate.

FIG. 5 illustrates an example machine of a computer system 500 that supports a folding scoreboard for maintaining sequentiality in accordance with examples as disclosed herein. The computer system 500 can include a set of instructions, for causing the machine to perform any one or more of the techniques described herein. In some examples, the computer system 500 can correspond to a host system (e.g., the host system 105 described with reference to FIG. 1) that includes, is coupled with, or utilizes a memory sub-system (e.g., the memory sub-system 110 described with reference to FIG. 1) or can be used to perform the operations of a controller (e.g., to execute an operating system to perform operations corresponding to the write manager 150 described with reference to FIG. 1). In some examples, the machine can be connected (e.g., networked) with other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies discussed herein.

The example computer system 500 can include a processing device 505, a main memory 510 (e.g., ROM, flash memory, DRAM such as SDRAM or Rambus DRAM (RDRAM), etc.), a static memory 515 (e.g., flash memory, static RAM (SRAM), etc.), and a data storage system 525, which communicate with each other via a bus 545.

Processing device 505 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 505 can also be one or more special-purpose processing devices such as an ASIC, an FPGA, a DSP, network processor, or the like. The processing device 505 is configured to execute instructions 535 for performing the operations and steps discussed herein. The computer system 500 can further include a network interface device 520 to communicate over the network 540.

The data storage system 525 can include a machine-readable storage medium 530 (also known as a computer-readable medium) on which is stored one or more sets of instructions 535 or software embodying any one or more of the methodologies or functions described herein. The instructions 535 can also reside, completely or at least partially, within the main memory 510 and/or within the processing device 505 during execution thereof by the computer system 500, the main memory 510 and the processing device 505 also constituting machine-readable storage media. The machine-readable storage medium 530, data storage system 525, and/or main memory 510 can correspond to a memory sub-system.

In one example, the instructions 535 include instructions to implement functionality corresponding to a write manager 550 (e.g., the write manager 150 described with reference to FIG. 1 or write manager 420 described with reference to FIG. 4). While the machine-readable storage medium 530 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine (e.g., a computer) readable storage medium such as ROM, RAM, magnetic disk storage media, optical storage media, flash memory components, etc.

In the foregoing specification, examples of the disclosure have been described with reference to specific example examples thereof. It will be evident that various modifications can be made thereto without departing from the broader spirit and scope of examples of the disclosure as set forth in the following claims. The specification and drawings are, accordingly, to be regarded in an illustrative sense rather than a restrictive sense.

What is claimed is:

1. A method, comprising:
   receiving, at a controller for a memory sub-system, a first write command from a host device to write a first block of data at a first memory address of a memory device of the memory sub-system;
   locking a first coherency of the first memory address responsive to receiving the first write command; and
   receiving a second write command generated by a processing core of the controller to write a second block of data at a second memory address of the memory device, wherein a second coherency of the second memory address is maintained in an unlocked state after receiving the second write command.

2. The method of claim 1, further comprising:
   updating, responsive to completing the second write command, a mapping record to indicate the second block of data is located at the second memory address, wherein the mapping record indicates that the second block of data is located at a prior memory address prior to the updating.

3. The method of claim 2, further comprising:
   updating, responsive to receiving the first write command, the mapping record to indicate the first block of data is located at the first memory address.

4. The method of claim 3, further comprising:
   receiving a read command to read the first block of data; and
   sending a coherency lock indication responsive to the read command.

5. The method of claim 1, wherein the first write command and the second write command are received at a first processing core of the controller, and the second write command is received from a second processing core of the controller.

6. The method of claim 5, wherein the second processing core of the controller executes a garbage collection procedure associated with the second write command.

7. The method of claim 1, wherein the locking the first coherency comprises:
   providing a coherency lock command and the first memory address to a coherency block of the controller.

8. A method comprising:
   receiving, at a controller for a memory sub-system, a first write command from a host device to write a first block of data at a first memory address of a memory device of the memory sub-system;
   locking a first coherency of the first memory address responsive to receiving the first write command;
   receiving, from a processing core of the controller, a second write command to write a second block of data at a second memory address of the memory device, wherein a second coherency of the second memory address is maintained in an unlocked state after receiving the second write command;
   receiving, a mapping record for the second block of data and a read command to read the second block of data;
   reading a prior memory address to provide the second block of data; and
   updating, responsive to completing the second write command, the mapping record to indicate the second block of data is located at the second memory address, wherein the mapping record indicates that the second block of data is located at the prior memory address prior to the updating.

9. A system, comprising:
   a plurality of memory components; and
   a processing device operatively coupled with the plurality of memory components, the processing device configured to:
   receive a first write command from a device that is external to the system, the first write command to write a first block of data at a first memory address of the plurality of memory components;
   lock a first coherency of the first memory address responsive to receiving the first write command;
   receive a second write command generated by a subcomponent of the system, the second write command to write a second block of data at a second memory address of the plurality of memory components; and
   maintain a second coherency of the second memory address in an unlocked state after receiving the second write command.

10. The system of claim 9, further comprising:
    the processing device further configured to:
    update, responsive to completing the second write command, a mapping record to indicate the second block of data is located at the second memory address, wherein the mapping record indicates that the second block of data is located at a prior memory address prior to the update.

11. The system of claim 10, further comprising:
    the processing device further configured to:
    update, responsive to receiving the first write command, the mapping record to indicate the first block of data is located at the first memory address.

12. The system of claim 11, further comprising:
    the processing device further configured to:
    receive a read command to read the first block of data; and
    send a coherency lock indication responsive to the read command.

13. The system of claim 9, wherein the first write command and the second write command are received at a first processing core of the processing device, and the second write command is received from a second processing core of the processing device.

14. The system of claim 13, wherein the second processing core executes a garbage collection procedure associated with the second write command.

15. A system, comprising:
    a plurality of memory components; and
    a processing device operatively coupled with the plurality of memory components, the processing device configured to:
    receive a first write command from a device that is external to the system, the first write command to write a first block of data at a first memory address of the plurality of memory components;

lock a first coherency of the first memory address responsive to receiving the first write command;
receive a second write command from a sub-component of the system, the second write command to write a second block of data at a second memory address of the plurality of memory components;
maintain a second coherency of the second memory address in an unlocked state after receiving the second write command;
receive, a mapping record for the second block of data and a read command to read the second block of data;
read a prior memory address to provide the second block of data; and
update, responsive to completing the second write command, the mapping record to indicate the second block of data is located at the second memory address, wherein the mapping record indicates that the second block of data is located at the prior memory address prior to the update.

16. A non-transitory computer-readable storage medium comprising instructions that, when executed by a processing device, cause the processing device to:
receive a first write command from an external device to write a first block of data at a first memory address of a memory device;
lock a first coherency of the first memory address responsive to receiving the first write command; and
receive a second write command generated by an internal component of the processing device to write a second block of data at a second memory address of the memory device, wherein a second coherency of the second memory address remains in an unlocked state after receiving the second write command.

17. The non-transitory computer-readable storage medium of claim 16, wherein the processing device is further configured to:
update, responsive to completing the second write command, a mapping record to indicate the second block of data is located at the second memory address, wherein the mapping record indicates that the second block of data is located at a prior memory address prior to the update.

18. The non-transitory computer-readable storage medium of claim 17, wherein the processing device is further configured to:
update, responsive to the first write command, the mapping record to indicate the first block of data is located at the first memory address.

19. The non-transitory computer-readable storage medium of claim 18, wherein the processing device is further configured to:
receive a read command to read the first block of data; and
send a coherency lock indication responsive to the read command.

20. A non-transitory computer-readable storage medium comprising instructions that, when executed by a processing device, cause the processing device to:
receive a first write command from an external device to write a first block of data at a first memory address of a memory device;
lock a first coherency of the first memory address responsive to receiving the first write command;
receive a second write command from an internal component of the processing device to write a second block of data at a second memory address of the memory device, wherein a second coherency of the second memory address remains in an unlocked state after receiving the second write command;
receive, a mapping record for the second block of data and a read command to read the second block of data;
read a prior memory address to provide the second block of data; and
update, responsive to completing the second write command, the mapping record to indicate the second block of data is located at the second memory address, wherein the mapping record indicates that the second block of data is located at the prior memory address prior to the update.

* * * * *